(12) United States Patent
Loof et al.

(10) Patent No.: US 9,863,471 B2
(45) Date of Patent: Jan. 9, 2018

(54) BEARING AND BEARING ARRANGEMENT

(71) Applicants: Marcus Loof, Nol (SE); Peter James, Mölndal (SE); Lars Stigsjöö, Angered (SE)

(72) Inventors: Marcus Loof, Nol (SE); Peter James, Mölndal (SE); Lars Stigsjöö, Angered (SE)

(73) Assignee: AKTIEBOLAGET SKF, Gothenburg (SE)

(*) Notice: Subject to any disclaimer, the term of this patent is extended or adjusted under 35 U.S.C. 154(b) by 47 days.

(21) Appl. No.: 15/091,828

(22) Filed: Apr. 6, 2016

(65) Prior Publication Data
US 2016/0298687 A1    Oct. 13, 2016

(30) Foreign Application Priority Data
Apr. 9, 2015 (SE) ..................... 1550418

(51) Int. Cl.
| | |
|---|---|
| *F16C 23/08* | (2006.01) |
| *F16C 33/36* | (2006.01) |
| *F16C 33/46* | (2006.01) |
| *F16C 33/48* | (2006.01) |
| *F03D 80/70* | (2016.01) |

(Continued)

(52) U.S. Cl.
CPC .............. *F16C 33/48* (2013.01); *F03D 80/70* (2016.05); *F16C 23/086* (2013.01); *F16C 19/38* (2013.01); *F16C 33/467* (2013.01); *F16C 33/49* (2013.01); *F16C 2240/80* (2013.01); *F16C 2360/31* (2013.01); *Y02E 10/722* (2013.01)

(58) Field of Classification Search
CPC ...... F16C 23/086; F16C 23/088; F16C 33/49; F16C 33/494; F16C 33/495; F16C 33/497; F16C 33/498
See application file for complete search history.

(56) References Cited

U.S. PATENT DOCUMENTS

| | | | |
|---|---|---|---|
| 2,375,145 A | 5/1945 | Styri | |
| 4,472,006 A * | 9/1984 | Goransson | F16C 23/086 384/576 |

(Continued)

FOREIGN PATENT DOCUMENTS

| | | | | |
|---|---|---|---|---|
| DE | 102012224148 A1 * | 7/2014 | .............. | F16C 41/02 |
| JP | 2004100866 A * | 4/2004 | .............. | F16C 23/086 |

(Continued)

*Primary Examiner* — Phillip A Johnson
(74) *Attorney, Agent, or Firm* — Bryan Peckjian; SKF USA Inc. Patent Dept.

(57) ABSTRACT

A spherical roller bearing is provided having an outer ring that includes at least one inner raceway, an inner ring that includes a first and a second outer raceway, a plurality of roller elements disposed in a first and second roller row between the at least one inner raceway and the first and second outer raceway, a cage for one of guiding and retaining the roller elements in the first and second roller row, the cage includes a plurality of cage pockets, in which one of the plurality pf rollers is disposed within each cage pocket. The bearing further provides a specific pitch circle diameter (PCD), and when the cage is under-pitch roller centered in relation to the pitch circle diameter (PCD). In addition, a bearing arrangement and a wind turbine bearing arrangement is disclosed.

10 Claims, 4 Drawing Sheets

(51) Int. Cl.
   *F16C 33/49*       (2006.01)
   *F16C 19/38*       (2006.01)

(56)            References Cited

U.S. PATENT DOCUMENTS 6,186,669 B1 *   2/2001  Honda ................ F16C 33/541
                                                           384/580
   6,715,927 B1     4/2004  Torisawa
   2011/0116734 A1* 5/2011  Umemoto ............ F16C 23/086
                                                           384/558

FOREIGN PATENT DOCUMENTS

JP         2008008445 A  *  1/2008  .............. F16C 33/48
   JP         2008025688 A  *  2/2008  .............. F16C 33/48
   JP         2010216546 A  *  9/2010  ............ F16C 33/494
   WO     WO 2005116470 A1  * 12/2005  ............ F16C 23/086

* cited by examiner

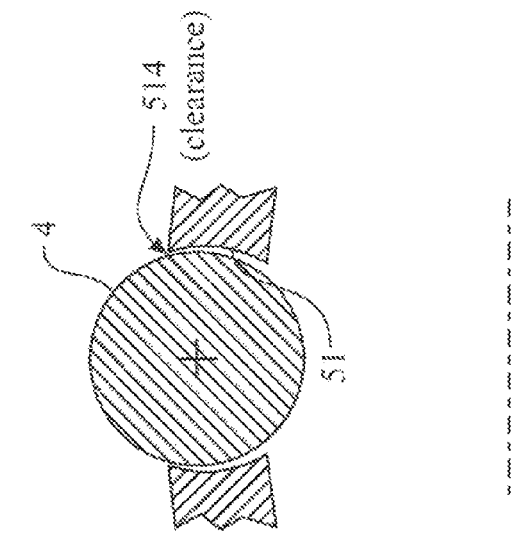
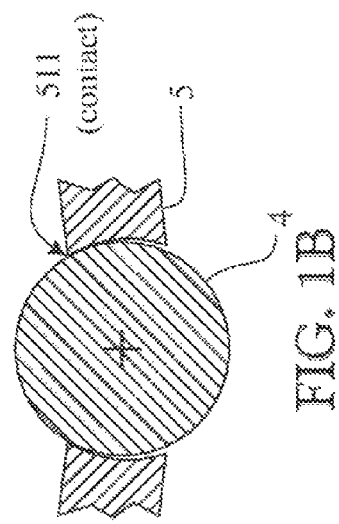
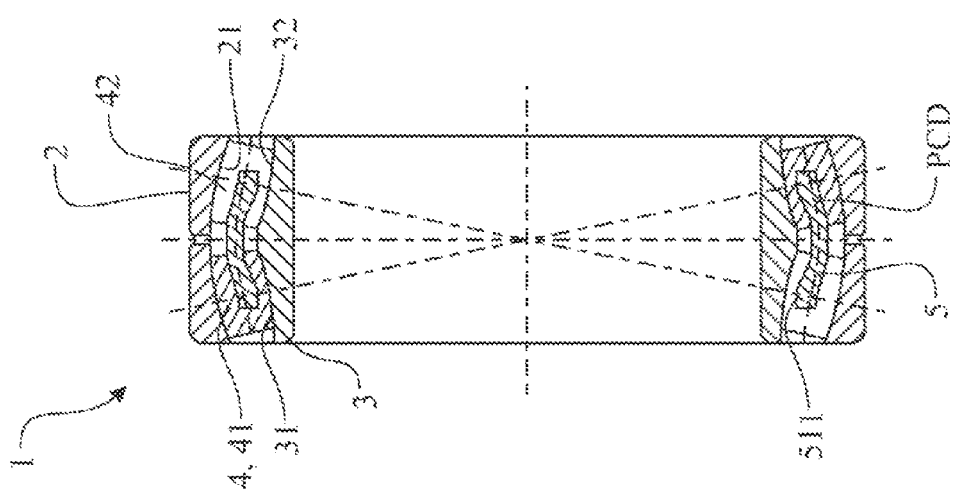
FIG. 1A
FIG. 1B

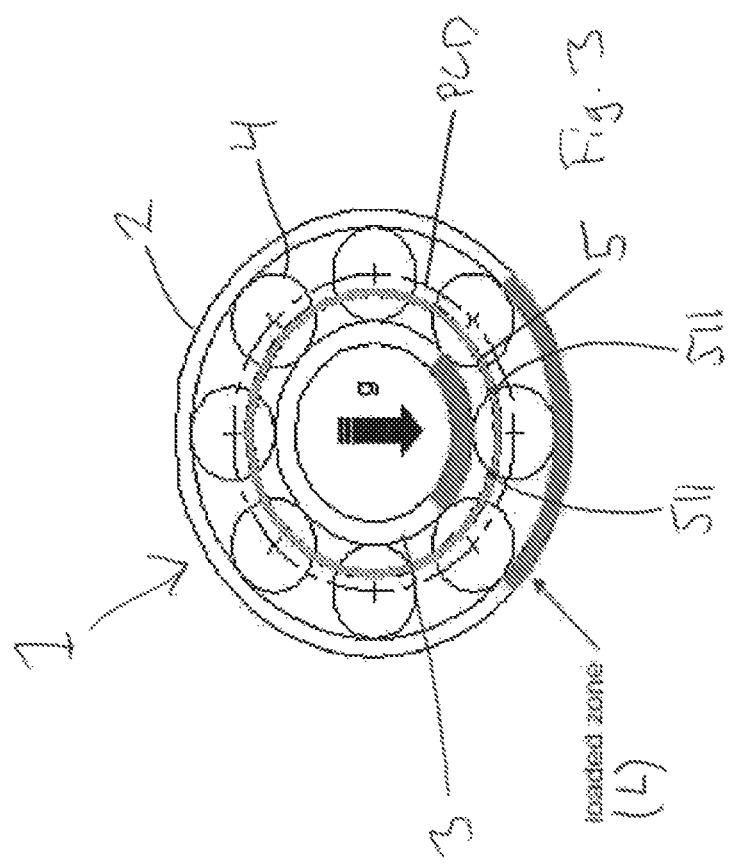

BEARING AND BEARING ARRANGEMENT

CROSS-REFERENCE TO RELATED APPLICATIONS

This application claims priority to Swedish patent application no. 1550418-6 filed on Apr. 9, 2015, the contents of which are fully incorporated herein by reference.

TECHNOLOGICAL FIELD

According to a first aspect, the invention regards a spherical roller bearing. According to a second aspect, the invention regards a bearing arrangement. According to a third aspect, the invention regards a wind turbine bearing arrangement.

BACKGROUND OF THE INVENTION

Spherical roller bearings are well known for its ability to accommodate radial and axial loads, but also for its misalignment ability. These bearings are used in many different applications, especially in more demanding applications where there are larger loads and also where there may be shaft deflections. One example of where a spherical roller bearing can be advantageously used is in wind turbine applications. Other examples of areas where these bearings can be a suitable alternative is in pulp and paper machines, marine applications, off-highway applications and in mining applications.

There are several different designs available. For instance, there are spherical roller bearings comprising comb-shaped cages, but also bearings comprising window type cages. In addition, some of the known designs include guide rings and other bearing types include mid-flanges on the inner rings. The different designs present different advantages and are thus useful and adapted to different needs. The bearings may for instance be optimized for different circumstances and environments, such as for high or low speed applications, mainly for radial loads, mainly for axial loads, large shaft deflections etc.

SUMMARY OF THE INVENTION

In view of the above, an object of the present invention is to provide a new spherical roller bearing design and bearing arrangement which alleviates at least some of the drawbacks of the prior art. Moreover, an object of the present invention is to provide a spherical roller bearing design which is especially advantageous for use in low-speed rotating applications.

The objects have been achieved by the features as presented in the independent claim. Advantageous embodiments of the invention can be found in the dependant claims and in the accompanying description.

According to the first aspect of the invention, the objects have been achieved by a spherical roller bearing, comprising, an outer ring presenting at least one inner raceway, an inner ring presenting a first and a second outer raceway, a plurality of roller elements arranged in a first and second roller row in-between the at least one inner raceway and the respective first and second outer raceway. Moreover, the bearing comprises a cage for guiding and/or retaining the roller elements in the first and second roller row, wherein the cage presents a plurality of cage pockets, in which each cage pocket one roller is meant to be located. The bearing further presents a specific pitch circle diameter, and wherein the cage is under-pitch roller centered in relation to the pitch circle diameter. With under-pitched is meant that the contact between the roller elements and the cage will be at a location which is radially inwardly from the pitch circle diameter. In addition, with roller centered is meant that the cage will be centered by the roller elements and not by for instance the inner ring or a guide ring which is common practice for known bearing designs.

A bearing's pitch circle diameter is something which is well known by the skilled person. The pitch circle diameter can be defined as the diameter that intersects the rotational axle of the roller elements in the bearing in an axial location of the bearing. In addition, the phrases axial and radial are frequently used in this document. If nothing else is stated, an axial direction is defined as the axial direction of the bearing which is parallel to its rotational axis, the axial direction of the inner ring which is parallel to its rotational axis, the axial direction of the outer ring which is parallel to its rotational axis and the axial direction of the cage which is parallel to its rotational axis. Radial direction is the direction which is perpendicular to the corresponding axial directions.

With this new design of having a cage that is roller centered and which is also under-pitch roller centered, the bearing, and especially the cage, will behave in a more stable manner especially for low-speed applications, and especially when the loaded zone of the bearing is located in a radial bottom region of the bearing in relation to the direction of the force of gravity. In addition, the bearing is especially advantageous for bearing arrangements which are essentially horizontal. The roller elements in the loaded zone will be essentially fixed in the radial and axial direction when they move along its rotational path in the tangential direction of the bearing. Since the roller elements in the loaded zone will not be able to extensively change its axial and radial position in-between the inner and outer ring the contact with the cage will be more stable than if the contact would be in the un-loaded zone of the bearing. Thus, the inventors have realized that it would be advantageous to let the cage be roller centered with the rollers which are in the loaded zone of the bearing. By having an under-pitch roller centering cage the contact between roller and cage will appear in the lower part of the bearing with respect to the force of gravity.

In an embodiment of the present invention, a spherical roller bearing is presented, wherein for at least one cage pocket, the cage pocket and the roller element being present therein further presents a specific cage pocket/roller element radial play, and wherein the cage pocket/roller element radial play is larger in the radially outward direction than in the radially inward direction with respect to the pitch circle diameter. By designing the cage pockets in this manner, the contact between the roller elements and the cage will be an under-pitched contact, i.e. the contact will be radially inwardly from the pitch circle diameter of the bearing.

In an embodiment of the present invention, a spherical roller bearing is presented, wherein the bearing further does not present any spacer ring (such as a guide ring) or mid-flange axially in-between the first and second roller rows. It is well known to make use of a guide ring axially in-between the two roller rows of the bearing. The guide ring is especially useful when the bearing is used in more high-speed applications. In addition, the cage is often centered on the guide ring, which in turn is in contact with the inner ring. By removing the guide ring from the bearing, there will be fewer components. This is of course advantageous in terms of cost, but also it may lead to a more robust bearing design due to the fact that there will be fewer components in the bearing. Moreover, a mid-flange, which is frequently used in prior art designs, is also costly to have since the manufacturing of an inner ring comprising a mid-flange will be more complicated. Also, the presence of a mid-flange will result in more material, leading to a higher weight and also a higher material cost. In addition, the design of the present invention will lead to that there will be a free space between the cage and the inner ring in-between the first and second roller row. This space can be used for lubricant, such as grease or oil. This may lead to that the lubrication of the contact between the raceways of the inner ring and the roller elements is improved since the lubricant can be stored in the proximity of these contact zones.

In another embodiment, a spacer ring or guide ring for guiding the roller elements is present axially in-between the first and the second roller row. A spacer ring may be needed in applications where there are higher rotating speeds. For instance, the spacer ring may guide the roller elements in the first and second roller row.

In an embodiment of the present invention, a spherical roller bearing is presented, wherein at least one of the plurality of cage pockets is radially outwardly enclosing the roller contained therein such that the roller element will be restricted to move radially outwardly out from the at least one cage pocket. By having such a design the roller elements can be prevented from falling out from the bearing, for instance during assembly of the bearing. In another embodiment, the inner ring further presents a first and second axially outer region on opposite axial sides of the bearing, wherein the respective first and second axially outer region presents a first and second respective side flange. The side flange can further improve and prevent rollers from falling out from the bearing.

In an embodiment of the present invention, a spherical roller bearing is presented, wherein the cage is a comb-shaped cage (also known as a pronge type cage). In an embodiment, the cage is made of a polymer, a metal such as brass, steel or iron, or any other suitable material recognized by the skilled person.

According to the second aspect of the invention, the objects are achieved by a bearing arrangement for low-speed rotating applications, wherein the bearing arrangement comprises a bearing according to the first aspect of the invention. It shall be noted that any embodiment of the first aspect of the invention is applicable to any embodiment of the second aspect of the invention and vice versa. It has been realized by the inventors that the bearing design according to the first aspect of the invention is especially advantageous for low-speed applications. In addition, the inventors have further realized that this design is suitable for applications where the loaded zone of the bearing will be in the radial bottom region of the bearing in relation to the direction of the gravity force. In another embodiment, the bearing arrangement is an essentially horizontal bearing arrangement.

In an embodiment of the present invention, a bearing arrangement for low-speed rotating applications is presented, wherein the bearing arrangement is meant to rotate at a speed of less than 50 routes per minute. In another embodiment, the rotating speed is less than any of 40, 30, 20 or 10 routes per minute. In another embodiment, the rotating speed is such that the rotating speed is lower than the threshold orbital speed at which roller elements are affected by centrifugal forces that exceeds the force of gravity.

According to the third aspect of the invention, the objects are achieved by a wind turbine bearing arrangement for supporting a main shaft of the wind turbine, wherein the arrangement comprises a bearing according to the first aspect of the invention. It shall be noted that any embodiment of the first aspect of the invention is applicable to any embodiment of the second and third aspect of the invention and vice versa. It has been realized by the inventors that the bearing design according to the first aspect of the invention is especially advantageous for wind turbine bearing arrangements. In addition, the inventors have further realized that this design is suitable for applications where the loaded zone of the bearing will be in the radial bottom region of the bearing in relation to the direction of the gravity force, which is often the case for wind turbines.

In an embodiment of the present invention, the wind turbine bearing arrangement is a 2-point suspension bearing arrangement. In another embodiment of the present invention, the wind turbine bearing arrangement is a 3-point suspension bearing arrangement.

Other embodiments and modifications to the current embodiments presented herein within the scope of the claims would be apparent to the skilled person. For example, the skilled person will understand and realize that the cage pocket geometry can be designed differently to still achieve the same effect, i.e. that the cage will be under-pitch roller centered.

BRIEF DESCRIPTION OF THE DRAWINGS

Exemplifying embodiments of the present invention will now be described in more detail, with reference to the accompanying drawings, wherein:

FIG. 1A shows a cross sectional view of a spherical roller bearing according to an embodiment of the invention;

FIG. 1B shows an enlarged view of a part of a cage and roller elements of the bearing in FIG. 11A, and seen from an axial side from the bearing;

FIG. 3 shows an axial end face of a spherical roller bearing according to an embodiment of the invention.

Figure 3A:
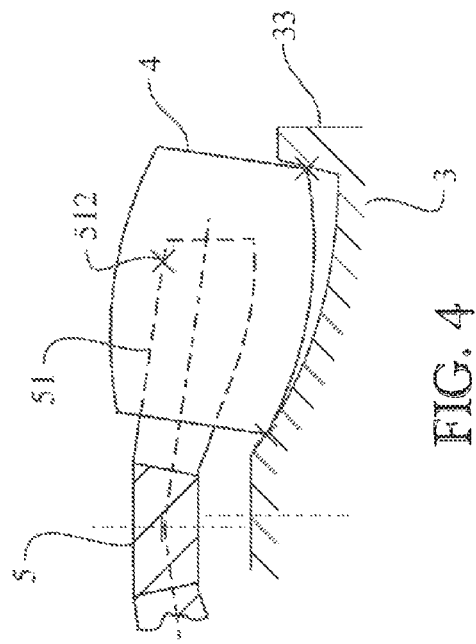
FIG. 3A shows an axial end face of a spherical roller bearing according to another embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention.

DETAILED DESCRIPTION OF THE INVENTION

FIG. 1A shows a cross sectional view of a bearing 1 according to an exemplifying embodiment of the present invention and FIG. 1B shows an enlarged view of a portion of the cage 5 in FIG. 1A and further including two roller pockets 51 containing two rollers 4. In FIG. 1A, the bearing 1 comprises an outer ring 2 which presents an inner spherical raceway 21. Moreover, the bearing 1 presents a cage 5, roller elements 4 arranged in a first and second roller row 41 and 42, and an inner ring 3 presenting a first and second outer raceway 31 and 32. The roller rows 41 and 42 are located in-between the respective first and second raceway, 31 and 32, and the inner spherical raceway 21. The cage 5 is designed such that the cage 5 is under-pitch roller centered. In FIG. 1A this is illustrated by the contact portion 511 on the cage 5, where the cage 5 will contact the roller elements 4. As further can be seen in FIG. 1A, there is no guide ring or mid-flange located in-between the first and second roller rows 41 and 42. Now turning to FIG. 1B, it will be clearly seen how the contact portion 511 in the cage pocket 51 comes into contact with the roller element 4. In this specific embodiment, the radial play of the cage pocket 51 is designed so that the radial play is larger in the radially outward direction than in the radially inward direction in respect of the pitch circle diameter PCD of the bearing 1. This will result in that the rollers will contact the cage 5 at the contact portion 511 as indicated in FIG. 1B. Further, it will lead to that there will be a clearance 513 between the cage pocket 51 and the roller elements 4 on the opposite side of the cage 5.

Figure 2:
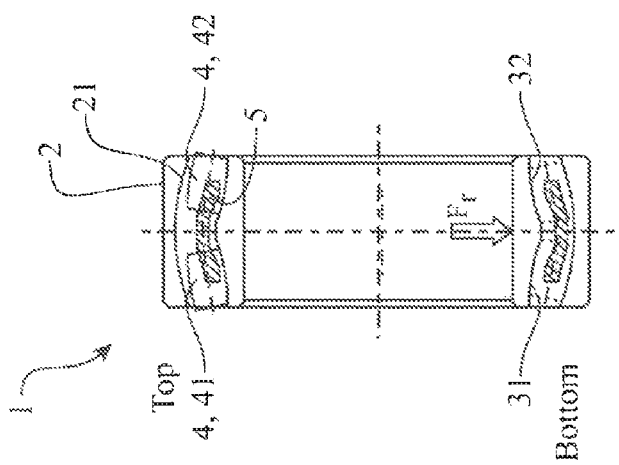
FIG. 2 shows a cross sectional view of a spherical roller bearing according to an embodiment of the invention.

FIG. 2 shows a cross sectional view of a bearing 1 according to an embodiment of the present invention. The bearing 1 comprises an outer ring 2 which presents an inner spherical raceway 21. Moreover, the bearing 1 presents a cage 5, roller elements 4 arranged in a first and second roller row 41 and 42, and an inner ring 3 presenting a first and second outer raceway 31 and 32. The roller rows 41 and 42 are located in-between the respective first and second raceway, 31 and 32, and the inner spherical raceway 21. The cage 5 is designed such that the cage 5 is under-pitch roller centered. Here, it can be seen that also the bearing presents a specific bearing clearance. In the top region of the bearing 1 it can be seen that there is no (or almost no) contact between the roller elements 4 and the inner raceway 21. This is due to the bearing clearance and to that there also is a radial load Fr acting on the inner ring and on the radial bottom region of the bearing. Thus, the loaded zone L will be in the bottom region of the bearing 1. As can be seen (which is exaggerated in this figure for better understanding the invention) the roller elements 4 will tend to fall axially outwardly from the top region of the bearing 1. This will especially occur when the rotating speed of the bearing 1 is low since the centrifugal forces of the roller elements will not be large enough to prevent the rollers 4 from moving axially outwardly. In this regard, it will be advantageous to let the rollers in the loaded zone L to center the cage 5, and this will be achieved by having an under-pitch roller centering function.

FIG. 3 shows an axial side face view of a bearing 1 according to an embodiment of the present invention. The bearing 1 comprises an outer ring 2 which presents an inner spherical raceway 21. Moreover, the bearing 1 presents a cage 5, roller elements 4 arranged in a first and second roller row 41 and 42, and an inner ring 3 presenting a first and second outer raceway 31 and 32. The roller rows 41 and 42 are located in-between the respective first and second raceway, 31 and 32, and the inner spherical raceway 21. The cage 5 is designed such that the cage 5 is under-pitch roller centered. Further in this view, it can be seen that there are contact portions 511 between the rollers 4 and the cage 5, where the contact is occurring radially inwardly from the pitch circle diameter PCD, i.e. the cage is under-pitch roller centered. As further can be seen in this figure, there is loaded zone L in the bearing which is in the radial bottom region of the bearing 1. Thus, by having an under-pitch roller centered cage 5, the cage 5 will be centered by the rollers 4 in the loaded zone L, which will lead to a more stable behavior of the cage 5 during operation. FIG. 3A illustrates an over-pitch roller centered cage 5.

Figure 4:
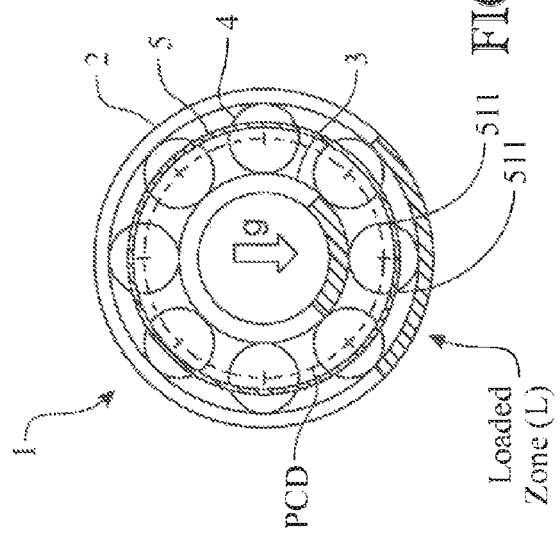
FIG. 4 shows a cross sectional view of an inner ring, a cage and a roller element of a spherical roller bearing according to an embodiment of the invention.

FIG. 4 shows a portion of a cross sectional view of a bearing 1 according to an embodiment of the present invention. In this view, a portion of an inner ring 3 can be seen, a cage 5, a roller 4 and a side flange 33 of the inner ring 3. Further, here it can be seen that the cage pocket 51 is outwardly enclosing the roller such that the roller 4 will not be able to move radially outwardly out from the cage pocket 51. This has been done by having a curved profile in the cage pocket 51 such that the roller 4 will eventually contact a contact portion 512 of the cage pocket 51. In addition, the side flange 33 will prevent the roller 4 from axially falling out from the bearing 1. This will lead to that the rollers 4 will be self-contained in the bearing 1. Thus, there is no need for having for example a window-type cage. The rollers 4 will still not be able to fall out from the bearing at any time. This is advantageous, especially for safety reasons.

Figure 5:
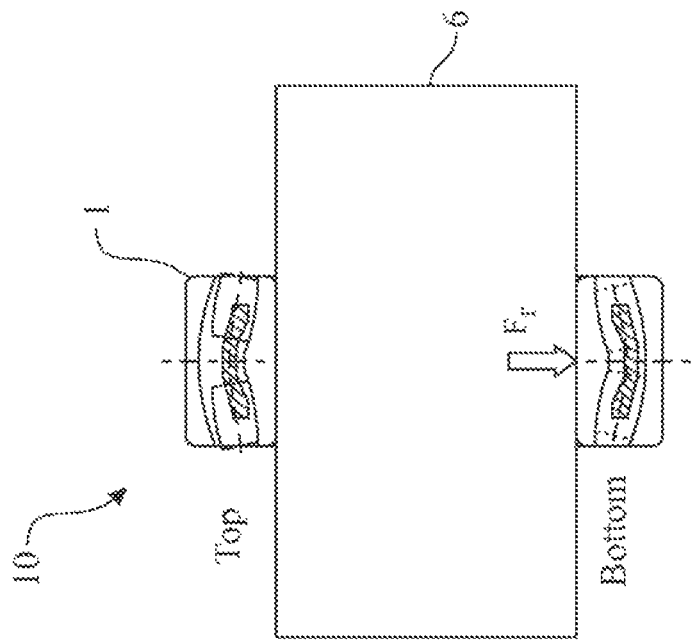
FIG. 5 shows a cross sectional view of a bearing arrangement according to the second aspect of the invention.

FIG. 5 shows a cross sectional view of a bearing arrangement 10 according to an embodiment of the second aspect of the present invention. The arrangement 10 comprises a bearing 1 according to the first aspect of the invention and a shaft 6. Further, it can be seen in this example that a force Fr is acting on the inner ring 3 of the bearing 1. The force Fr is acting on the radial bottom region of the bearing 1 thereby creating a loaded zone in the radial bottom region of the bearing.

Figure 6:
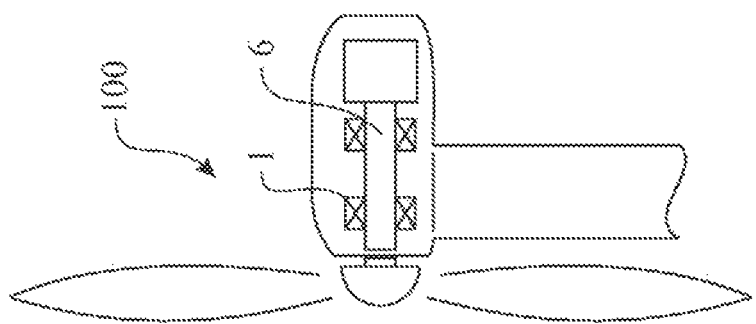
FIG. 6 shows a cross sectional view of a wind turbine bearing arrangement according to the third aspect of the invention.

FIG. 6 shows a cross sectional view of a wind turbine bearing arrangement 100 according to the third aspect of the present invention. The wind turbine bearing arrangement 100 comprises a bearing 1 according to the first aspect of the invention and a main shaft 6 of the wind turbine.

The invention claimed is:
1. A spherical roller bearing, comprising:
an outer ring providing at least one inner raceway,
an inner ring providing a first and a second outer raceway,
a plurality of roller elements disposed within a first and second roller row and between the at least one inner raceway and the first and second outer raceway,
a cage for one of guiding and retaining the roller elements in the first and second roller row, the cage providing a plurality of cage pockets, one of the plurality of rollers being disposed within each cage pocket,
wherein the spherical roller bearing has a specific pitch circle diameter (PCD), wherein the cage is under-pitch roller centered in relation to the pitch circle diameter (PCD) such that all of the contact, in the circumferential direction, between the plurality of roller elements and the cage occurs radially inwardly from the pitch circle diameter (PCD).
2. The spherical roller bearing according to claim 1, wherein for at least one cage pocket, the cage pocket and the roller element being provided therein further includes a specific cage pocket/roller element radial play, and wherein the cage pocket/roller element radial play is larger in the radially outward direction than in the radially inward direction with respect to the pitch circle diameter (PCD).
3. The spherical roller bearing according to claim 1, wherein no spacer ring is disposed axially between the first and second roller rows.
4. The spherical roller bearing according to claim 1, wherein at least one of the plurality of cage pockets is radially outwardly enclosing the roller contained therein such that the roller element will be restricted to move radially outwardly out from the at least one cage pocket.

5. The spherical roller bearing according to claim 1, wherein the inner ring further comprises a first and second axially outer region on opposite axial sides of the bearing, and wherein the respective first and second axially outer region provides a first and second respective side flange.

6. The spherical roller bearing according to claim 1, wherein the cage is a comb-shaped cage.

7. A bearing arrangement for low-speed rotating applications, the bearing arrangement comprises:
- a bearing having an outer ring providing at least one inner raceway,
- an inner ring providing a first and a second outer raceway,
- a plurality of roller elements disposed within a first and second roller row and between the at least one inner raceway and the first and second outer raceway,
- a cage for one of guiding and retaining the roller elements in the first and second roller row, the cage providing a plurality of cage pockets, one of the plurality of rollers being disposed within each cage pocket,
- a specific pitch circle diameter (PCD), wherein
- the cage is under-pitch roller centered in relation to the pitch circle diameter (PCD) such that all of the contact, in the circumferential direction, between the plurality of roller elements and the cage occurs radially inwardly from the pitch circle diameter (PCD).

8. The bearing arrangement for low-speed rotating applications according to claim 7, wherein the bearing arrangement rotates at a speed of less than 50 routes per minute.

9. The spherical roller bearing according to claim 1, wherein no mid-flange is disposed axially between the first and second roller rows.

10. A wind turbine bearing arrangement for supporting a main shaft of the wind turbine, wherein the arrangement comprises:
- a bearing having an outer ring providing at least one inner raceway,
- an inner ring providing a first and a second outer raceway,
- a plurality of roller elements disposed within a first and second roller row and between the at least one inner raceway and the first and second outer raceway, a cage for one of guiding and retaining the roller elements in the first and second roller row, the cage providing a plurality of cage pockets, one of the plurality of rollers being disposed within each cage pocket, a specific pitch circle diameter (PCD), wherein
- the cage is under-pitch roller centered in relation to the pitch circle diameter (PCD) such that all of the contact, in the circumferential direction, between the plurality of roller elements and the cage occurs radially inwardly from the pitch circle diameter (PCD).

* * * * *